CIRCUIT ARRANGEMENT FOR VARYING THE OPERATING POINT OF A TRANSISTOR WITH CONSTANT DISSIPATION

Filed Feb. 12, 1965

INVENTOR.
HERMAN SCHOEN
BY Frank R. Trifari
AGENT

United States Patent Office 3,390,285

Patented June 25, 1968

3,390,285

CIRCUIT ARRANGEMENT FOR VARYING THE OPERATING POINT OF A TRANSISTOR WITH CONSTANT DISSIPATION

Hermann Schoen, Hamburg-Lokstedt, Germany, assignor to North American Philips Company, Inc., New York, N.Y., a corporation of Delaware Filed Feb. 12, 1965, Ser. No. 432,141
Claims priority, application Germany, Mar. 3, 1964, P 33,735
8 Claims. (Cl. 307—296)

ABSTRACT OF THE DISCLOSURE

A circuit for holding the collector dissipation of a transistor constant while its collector current is varied includes a second transistor connected with its emitter-collector path in series with the emitter-collector path of the first transistor. A potentiometer is connected between the emitter of the second transistor and the base of the first transistor. The variable tap of the potentiometer is connected to a point of reference potential. A constant current is applied to the end of the potentiometer connected to the base of the first transistors.

As is known, the properties of a transistor are determined by its operating point, i.e. by the collector-base voltage and the emitter current, while also some parameters depend to a great extent upon the crystal temperature. The crystal temperature depends upon the ambient temperature of the transistor to be tested also upon the dissipation caused in the crystal during the measurement. The ambient temperature can be measured and kept constant with simple means, but any change of the operating point during the measurement in general results in a corresponding variation of the dissipation and thus also of the crystal temperature. As a result of this variation the determination of the current- and voltage dependence of the parameter in question is greatly impeded.

This difficulty may be removed by varying the operating point so that the resulting dissipation remains constant. Since the dissipation in question in the active operation range of the transistor arises primarily in the collector barrier layer, it is sufficient to keep the product of the collector-base voltage and the collector current constant.

It is normal and known to do this so that a variable voltage source (for the collector-base voltage $U_{CB}$) and a variable current source (for the emitter current $I_E$) are adjusted individually to the required values. However, this method is very cumbersome and time-consuming. In addition it requires a calculation of the current each time the voltage is adjusted.

According to the invention, these drawbacks are avoided by providing a potentiometer which simultaneously influences the voltage at and the current through the transistor in opposite senses.

In this case it is of advantage to be able to continuously adjust the dissipation occurring in each individual case, by means of a further potentiometer.

In order that the invention may readily be carried into effect, it will now be described in greater detail with reference to the accompanying drawing, in which—

Figure 1:
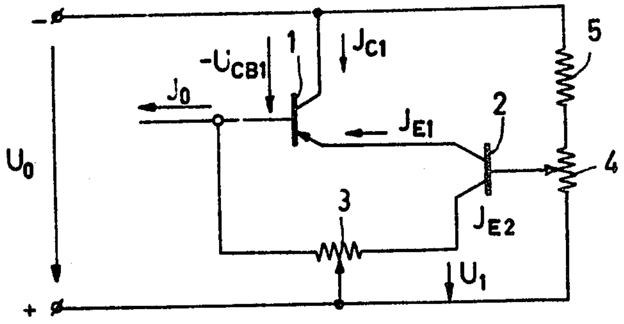
FIG. 1 shows a circuit arrangement according to the invention.

The emitter connection of the transistor 1 to be measured (FIG. 1) is connected to the collector of the transistor 2 serving as current source. Since the collector current of a transistor is nearly equal to the emitter current and, within wide limits, independent of the collector-base voltage, it is true with sufficient accuracy that $$I_{E1}=-I_{C2}=I_{E2}$$

Let it be assumed that the direct current amplification A equals 1. The emitter current of the transistor 2 may be varied by means of the potentiometer 3. When the part of the potentiometer 3 located in the emitter circuit of the transistor 2 is assumed to be equal to $n.R$, where R is the total resistance of the potentiometer it holds for $n$ between 0 and 1=that $$I_{E2}=\frac{U_1}{n.R}=I_{E1}=-I_{C1} \tag{1}$$

$U_1$ is equal to the difference between the voltage derived from the potentiometer 4 and the base-emitter voltage $U_{EB2}$ of the transistor 2. Within the operating range, $U_{EB2}$ is only slightly dependent upon $I_{E2}$, so that $U_1$ is substantially constant.

When it is assumed, that the base current $I_{B1}$ of the transistor 1 is small with respect to $I_0$, it is further true that $$-U_{CB1}=U_0-I_0(1-n)R \tag{2}$$

In this manner the following equation is obtained for the collector dissipation with sufficient approximation:

$$N_{C1}=I_{C1}.U_{CB1}=\left(\frac{U_0-I_0R}{n.R}+I_0\right)U_1 \tag{3}$$

The collector dissipation becomes independent of $n$ (and consequently of the adjusted operating point), when $U_0-I_0R$ becomes 0. This can simply be realised, for example, by suitable choice of $I_0$. The Equation 3 then becomes:

$$N_{C1}=I_0\cdot U_1$$

In this equation, $I_0$ is established by the above conditions, $U_1$ on the contrary may be varied. As a result, the dissipation may be adjusted by means of the potentiometer 4, the range of variation of which is restricted by the resistor 5. The dissipation is proportional to the voltage derived. The current generator may have, for example, the form of a voltage source with high internal resistance. The E.M.F. then must be large with respect to $U_0$ to ensure that during the operating point variation of the transistor 1 $I_0$ remains constant. In order to be independent of fluctuations of the mains voltage, $U_0$ will be derived from a stabilised voltage source. In that case, however, $I_0$ also must be stabilised. As a result of this, the circuit arrangement in this case becomes complicated and expensive.

Figure 2:
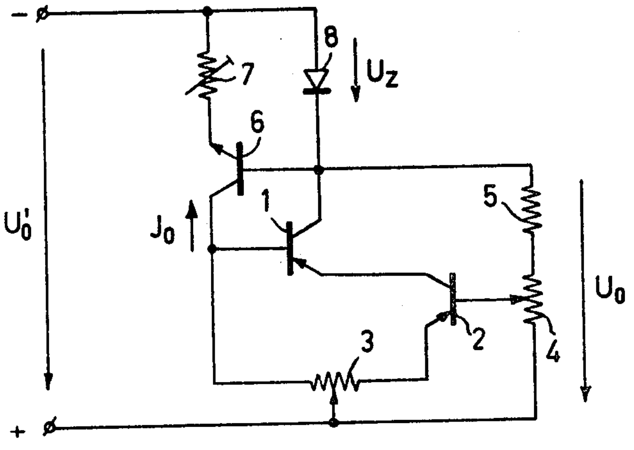
FIG. 2 shows an improved embodiment with, in addition, a stabilised current source.

Therefore, in the circuit arrangement shown in FIG. 2, another route is used in that for producing $I_0$ a further transistor 6 is used which must be of the type which is complementary to the type of the transistors 1 and 2. 8 is a Zener-diode, the Zener-voltage $U_Z$ of which determines the voltage loss across the resistor 7. This resistor is adjusted so that the collector current of the transistor 6 becomes equal to the required value of $I_0$. In this case, a stabilised supply voltage $U_0'=U_0+U_Z$ is sufficient. $I_0$ is stabilised also by the constant Zener-voltage.

What is claimed is:

1. A circuit for keeping the dissipation of a first transistor constant, comprising a second transistor, a potentiometer connected between the base of said first transistor and the emitter of said second transistor, the tap of said potentiometer being connected to a point of reference potential, means connecting the collector of said second transistor to the emitter of said first transistor, and biasing means connected to the base of said second transistor, whereby collector current of said first transistor is dependent upon the position of said tap and collector dissipation of said first transistor is substantially independent of the position of said tap.

2. A circuit for keeping the dissipation of a first transistor constant, comprising a second transistor of the same conductivity as said first transistor, a source of operating potential having first and second terminals, a potentiometer having one end connected to the base of said first trasistor, the other end connected to the emitter of said second transistor, and a variable tap connected to said first terminal, means connecting the collector of said second transistor to the emitter of said first transistor, means connecting the collector of said first transistor to said second terminal, and biasing means connected to the base of said second transistor, whereby the collector current of said first transistor is dependent upon the position of said tap and the collector dissipation of said first transistor is independent of the position of said tap.

3. A circuit for keeping the dissipation of a first transistor constant, comprising a second transistor of the same conductivity as said first transistor, a source of operating potential having first and second terminals, a potentiometer having one end connected to the base of said first transistor, the other end connected to the emitter of said second transistor, and a variable tap connected to said first terminal, means connecting the collector of said second transistor to the emitter of said first transistor, means connecting the collector of said first transistor to said second terminal, and biasing means connected to the base of said second transistor, and a source of current connected to supply a substantially constant current to the portion of said potentiometer between said one end and said tap, said current being substantially equal to $V/R$, where V is the voltage between said first and second terminals and R is the total resistance of said potentiometer, whereby the collector current of said first transistor is dependent upon the position of said tap and the collector dissipation of said first transistor is independent of the position of said tap.

4. The circuit of claim 3 in which said source of current comprises a third transistor of the opposite conductivity type, means connecting the base and collector of said third transistor to the collector and base of said first transistor respectively, said source of potential having a third terminal of higher potential than said second terminal with respect to said first terminal, and means connecting the emitter of said third transistor to said third terminal.

5. The circuit of claim 4 wherein said source of potential comprises a Zener diode connected between said second and third terminals.

6. The circuit of claim 4 wherein said means connecting said emitter of said third transistor to said third terminal comprises a variable resistor.

7. A circuit for testing a first transistor having emitter, base and collector electrodes, said circuit comprising a source of voltage having first and second terminals, a second transistor of the same conductivity type as said first transistor and having emitter, base and collector electrodes, a potentiometer having a variable tap connected to said first terminal, means connecting one end of said potentiometer to the base of said first transistor and the other end thereof to the emitter of said second transistor, means connecting the emitter of said first transistor to the collector of said second transistor, means connecting the collector of said first transistor to said second terminal, voltage divider means connected between said first and second terminals for applying an adjustable voltage to the base of said second transistor, and a source of current connected between said first terminal and the base of said first transistor.

8. A circuit for keeping the dissipation of a first transistor constant, comprising a source of operating potential having first and second terminals, a potentiometer having one end connected to the base of said first transistor and a variable tap connected to said first terminal, a second transistor, means connecting the emitter-collector paths of said first and second transistors in series in that order between the other end of said potentiometer and said second terminal, biasing means connected to the base of said second transistor, a source of a current substantially equal to the ratio of the voltage between said first and second terminals and the total resistance of said potentiometer, and means supplying said current to the end of said potentiometer between said one end and said tap.

References Cited

UNITED STATES PATENTS

| | | | |
|---|---|---|---|
| 3,018,432 | 1/1962 | Palmer | 323—66 |
| 3,069,617 | 12/1962 | Mohler | 307—88.5 |
| 3,114,872 | 12/1963 | Allard | 323—4 |
| 3,241,044 | 3/1966 | Mills | 307—88.5 |
| 3,304,489 | 2/1967 | Brolin et al. | 307—88.5 |

OTHER REFERENCES

Digital Computer Components and Circuits, by R. K. Richards, published November 1957 by Van Nostrand, pp. 178–181.

ARTHUR GAUSS, *Primary Examiner.*

H. DIXON, *Assistant Examiner.*